(12) United States Patent
Moon et al.

(10) Patent No.: US 12,744,291 B2
(45) Date of Patent: Sep. 22, 2026

(54) SECONDARY BATTERY

(71) Applicant: Samsung SDI Co., Ltd., Yongin-si (KR)

(72) Inventors: Jin Young Moon, Yongin-si (KR); Gun Gue Park, Yongin-si (KR); Sung Gwi Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1003 days.

(21) Appl. No.: 17/805,608

(22) Filed: Jun. 6, 2022

(65) Prior Publication Data

US 2023/0017279 A1 Jan. 19, 2023

(30) Foreign Application Priority Data

Jun. 30, 2021 (KR) ........................ 10-2021-0085719

(51) Int. Cl.

| | |
|---|---|
| ***H01M 50/567*** | (2021.01) |
| ***H01M 50/107*** | (2021.01) |
| ***H01M 50/186*** | (2021.01) |
| ***H01M 50/342*** | (2021.01) |

(52) U.S. Cl.

CPC ....... *H01M 50/567* (2021.01); *H01M 50/107* (2021.01); *H01M 50/186* (2021.01); *H01M 50/3425* (2021.01); *H01M 2200/20* (2013.01)

(58) Field of Classification Search

CPC ............. H01M 50/107; H01M 50/183; H01M 50/186; H01M 50/567; H01M 2200/20

See application file for complete search history.

(56) References Cited

U.S. PATENT DOCUMENTS

| | | | | |
|---|---|---|---|---|
| 5,585,207 A * | 12/1996 | Wakabe | ................ | H01M 4/382 429/178 |
| 8,685,561 B2 | 4/2014 | Choi | | |
| 9,647,248 B2 | 5/2017 | Kim | | |
| 11,876,166 B2 | 1/2024 | Kim | | |
| 12,266,755 B2 | 4/2025 | Kim | | |
| 2004/0023107 A1 | 2/2004 | Nakanishi et al. | | |
| 2008/0102356 A1 | 5/2008 | Choi | | |

(Continued)

FOREIGN PATENT DOCUMENTS

| | | |
|---|---|---|
| CN | 206460987 U | 9/2017 |
| CN | 210073927 U | 2/2020 |

(Continued)

OTHER PUBLICATIONS

Extended European Search Report issued in corresponding application No. EP 22181858.6, dated Jan. 5, 2023, 6 pages.

(Continued)

*Primary Examiner* — Olatunji A Godo

(74) *Attorney, Agent, or Firm* — Womble Bond Dickinson (US) LLP

(57) ABSTRACT

A secondary battery includes: an electrode assembly including a first electrode plate, a second electrode plate, and a separator; a can having a closed upper surface with a rivet opening therein and an open lower surface to accommodate the electrode assembly, the can being electrically connected to the first electrode plate; a rivet terminal in the rivet opening and electrically connected to the second electrode plate; a gasket between the can and the rivet terminal; and a cap plate sealing the lower surface of the can.

5 Claims, 7 Drawing Sheets

(56) References Cited

U.S. PATENT DOCUMENTS

| | | | | |
|---|---|---|---|---|
| 2013/0280559 | A1* | 10/2013 | Guidal | H05K 1/0268 429/50 |
| 2014/0212743 | A1 | 7/2014 | Kim | |
| 2020/0067030 | A1 | 2/2020 | Juzkow | |
| 2022/0069335 | A1 | 3/2022 | Kim | |
| 2022/0231345 | A1* | 7/2022 | Hwangbo | H01M 50/477 |
| 2023/0178831 | A1* | 6/2023 | Ootsuka | H01M 50/184 429/174 |
| 2024/0136564 | A1 | 4/2024 | Kim | |
| 2024/0234788 | A9 | 7/2024 | Kim | |

FOREIGN PATENT DOCUMENTS

| | | | |
|---|---|---|---|
| CN | 112889169 | A | 6/2021 |
| JP | 2001-135357 | | 5/2001 |
| KR | 10-08965391 | B1 | 10/2008 |
| KR | 10-2013-0052408 | | 5/2013 |
| KR | 10-2014-0096664 | | 8/2014 |
| KR | 10-2020-0020173 | A | 2/2020 |

OTHER PUBLICATIONS

Korean Office action issued in corresponding application No. 10-2021-0085719, dated Oct. 13, 2022, 4 pages.
Chinese Office Action issued in corresponding CN Patent Application No. 202210697116.X, dated Aug. 19, 2025, 6 pages.

* cited by examiner

SECONDARY BATTERY

CROSS-REFERENCE TO RELATED APPLICATION

This application claims priority to and the benefit of Korean Patent Application No. 10-2021-0085719, filed on Jun. 30, 2021, in the Korean Intellectual Property Office, the content of which in is herein incorporated by reference in its entirety.

BACKGROUND

1. Field

Aspects of embodiments of the present disclosure relate to a secondary battery.

2. Description of the Related Art

Different from primary batteries, which are not designed to be rechargeable, secondary batteries are designed to repeatedly charged and discharged. Low-capacity secondary batteries are widely employed in small sized portable electronic devices, such as smart phones, feature phones, tablet computers, notebook computers, digital cameras, camcorders, etc., while large-capacity secondary batteries are typically used for driving motors of hybrid automobiles, electric automobiles, etc.

The secondary battery may include an electrode assembly including positive and negative electrodes, a housing (e.g., a can) accommodating the electrode assembly, terminals connected to the electrode assembly, and so on. Secondary batteries may be cylindrical, prismatic, or pouch types, according to their housing type and shape.

The above information disclosed in this Background section is for enhancement of understanding of the background of the present disclosure and, therefore, it may contain information that does not constitute prior art.

SUMMARY

An embodiment of the present disclosure provides a secondary battery in which a negative electrode and a positive electrode are both provided at one surface of a can.

The present disclosure also provides a secondary battery that can smoothly release pressure without interference to a safety vent by a bus bar in an assembled state.

The present disclosure also provides a secondary battery exhibiting sufficient sealing strength and improved welding quality.

A secondary battery according to an embodiment of the present disclosure includes: an electrode assembly including a first electrode plate, a second electrode plate, and a separator; a can having a closed upper surface and an open lower surface to accommodate the electrode assembly, the can being electrically connected to the first electrode plate and having a rivet opening (e.g., a rivet hole) in the upper surface; a rivet terminal in the rivet opening and electrically connected to the second electrode plate; a gasket between the can and the rivet terminal; and a cap plate sealing the lower surface of the can.

The rivet terminal may include: a shaft extending (or inserted) through the rivet opening; a first flange extending radially outwardly from an upper end of the shaft; and a second flange extending radially outwardly from a lower end of the shaft.

The gasket may include: a first member between the upper surface of the can and the first flange; a second member between the upper surface of the can and the second flange; and a third member between the rivet opening and the shaft.

The secondary battery may further include a reinforcement plate having higher rigidity than the rivet terminal between the second flange and the second member.

The ratio of a diameter of the first flange to the diameter of the upper surface of the can may be in a range of 10% to 65%.

The cap plate may include a safety vent or a degassing structure.

BRIEF DESCRIPTION OF DRAWINGS

FIGS. 7 to 9 show a process of installing a rivet terminal in the secondary battery according to another embodiment of the present disclosure.

DETAILED DESCRIPTION

Figure 1:
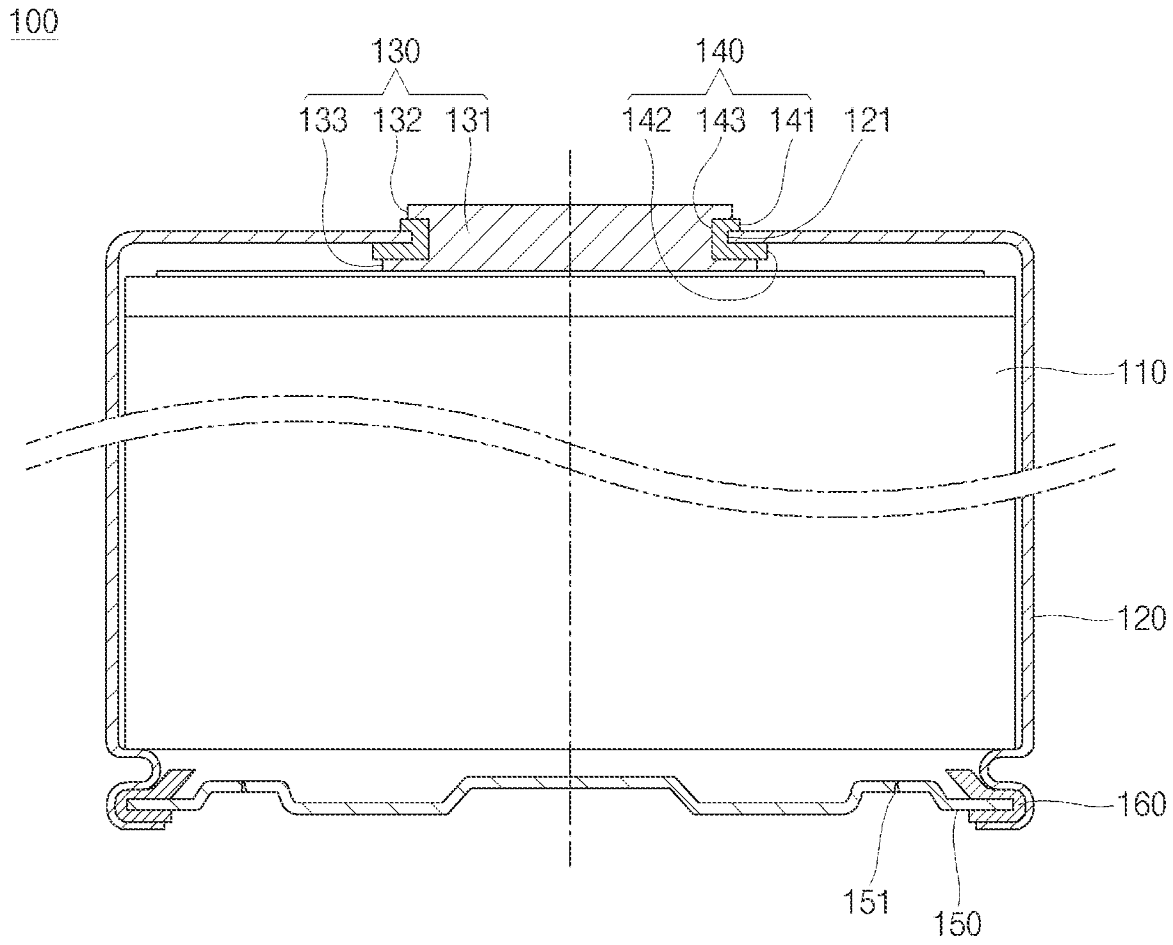
FIG. 1 is a schematic diagram of a secondary battery according to an embodiment of the present disclosure.

Hereinafter, embodiments of the present disclosure will be described, in detail, with reference to the accompanying drawings.

Embodiments of the present disclosure are provided to more completely explain the present disclosure. The following embodiments may be embodied in many different forms, and the present disclosure should not be construed as being limited to the embodiments set forth herein. Rather, these embodiments are provided so that this disclosure will be thorough and complete and will fully convey the aspects and features of the present disclosure to a person skilled in the art.

In the accompanying drawings, sizes or thicknesses of various components may be exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, element A can be directly connected to element B or an intervening element C may be present therebetween such that element A and element B are indirectly connected to each other.

The terminology used herein is for the purpose of describing particular embodiments and is not intended to be limiting of the present disclosure. As used herein, the singular forms are intended to include the plural forms as well, unless the context clearly indicates otherwise. It will be further understood that the terms that the terms "have," "comprise" or "include" and variations thereof, when used in this specification, specify the presence of stated features, numbers, steps, operations, elements, and/or components but do not preclude the presence or addition of one or more other features, numbers, steps, operations, elements, components, and/or groups thereof.

Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

FIG. 1 is a schematic diagram of a secondary battery 100 according to an embodiment of the present disclosure.

Referring to FIG. 1, a secondary battery 100 according to an embodiment of the present disclosure includes an electrode assembly 110, a can 120, a rivet terminal 130, a gasket 140, and a cap plate 150.

The electrode assembly 110 includes a first electrode plate, a second electrode plate, and a separator. The first electrode plate may be any one of a negative electrode plate and a positive electrode plate. When the first electrode plate is a negative electrode plate, the first electrode plate may include, for example but without being limited thereto, a negative electrode coating portion in which a negative electrode active material is coated on a negative electrode current collector plate made of a thin conductive metal plate, for example, copper or nickel foil or mesh, and negative electrode non-coating portion at where the negative electrode active material is not coated. Here, the negative active material may be made of, for example but without being limited thereto, a carbon-based material, Si, Sn, tin oxide, a tin alloy composite, a transition metal oxide, lithium metal nitrite, or a metal oxide.

The second electrode plate may be the other one of the negative electrode plate and the positive electrode plate. As described above, when the first electrode plate is a negative electrode plate, the second electrode plate may be a positive electrode plate. In this embodiment, the second electrode plate may include a positive electrode coating portion in which a positive electrode active material is coated on a positive electrode current collector plate made of a thin metal plate having excellent conductivity, for example, aluminum foil or mesh, and a positive electrode non-coating portion at where the positive electrode active material is not coated. Here, the positive electrode active material may be, for example but without being limited thereto, a chalcogenide compound, for example, a composite metal oxide, such as $LiCoO_2$, $LiMn_2O_4$, $LiNiO_2$, $LiNiMnO_2$, or the like. The separator is interposed between the first electrode plate and the second electrode plate to prevent a short circuit between the first electrode plate and the second electrode plate. The separator may be made of, for example but without being limited thereto, polyethylene, polypropylene, a porous copolymer of polyethylene and polypropylene, and the like. In addition, the separator may be larger than the first electrode plate and the second electrode plate to effectively prevent a short circuit between the first electrode plate and the second electrode plate. The electrode assembly 110 may be wound in the form of a so-called jelly-roll.

The can 120 has a cylindrical shape having a closed surface (e.g., an upper surface) and an open surface (e.g., a lower surface). The can 120 accommodates the electrode assembly 110 and may be electrically connected to the first electrode plate of the electrode assembly 110. As described above, when the first electrode plate of the electrode assembly 110 is a negative electrode plate, the can 120 will have a negative polarity. In addition, the can 120 has a rivet hole (e.g., a rivet opening) 121 formed in one surface, that is, in the upper surface, for installing a rivet terminal 130, to be described later. The rivet hole 121 is illustrated as being positioned at the center of the upper surface of the can 120, but the rivet hole 121 may be positioned away from (or offset from) the center of the upper surface of the can 120. However, for ease of description, the following description will be made with respect to an embodiment in which the rivet hole 121 is located in the center of the upper surface of the can 120 as shown in the drawing.

The rivet terminal 130 is installed in the rivet hole 121 in the can 120. The rivet terminal 130 is installed in a rivet manner and has a rivet shape. For example, the rivet terminal 130 may include a shaft 131 inserted through the rivet hole 121 in the can 120, a first flange 132 that extends radially outwardly from the upper end of the shaft 131 beyond the edge of the rivet hole 121, and a second flange 133 that extends radially outward from the lower end of the shaft 131 beyond the edge of the rivet hole 121. Therefore, the rivet terminal 130 may not be separated downwardly from the rivet hole 121 by the first flange 132 and may not be being separated upwardly from the rivet hole 121 by the second flange 133. In addition, the rivet terminal 130 may be electrically connected to the second electrode plate of the electrode assembly 110. As described above, when the second electrode plate of the electrode assembly 110 is a positive electrode plate, the rivet terminal 130 will have a positive polarity.

The gasket 140 electrically insulates the can 120 and the rivet terminal 130 from each other. To this end, the gasket 140 may include a first member (e.g., a first portion) 141 disposed between the upper surface of the can 120 and the first flange 132 of the rivet terminal 130, a second member (e.g., a second portion) 142 disposed between the upper surface of the can 120 and the second flange 133, and a third member (e.g., a third portion) 143 disposed between the rivet hole 121 in (e.g., the edge of the rivet hole 121 of) the can 120 and the shaft 131 of the rivet terminal 130. In the drawing, the first member 141, the second member 142, and the third member 143 are illustrated as being integrally formed, but they may be separately formed. However, for ease of description, the following description will be made with respect to an embodiment in which the first member 141, the second member 142, and the third member 143 are integrally formed as shown in the drawing. Furthermore, for stable insulation, the first member 141 may be formed to be larger, that is, radially wider outwardly, than the first flange 132, and the second member 142 may be formed to be larger, that is, radially wider outwardly, than the second flange 133.

FIGS. 2 to 5 show a process of installing the rivet terminal 130 in the secondary battery 100 according to an embodiment of the present disclosure.

Figure 2:
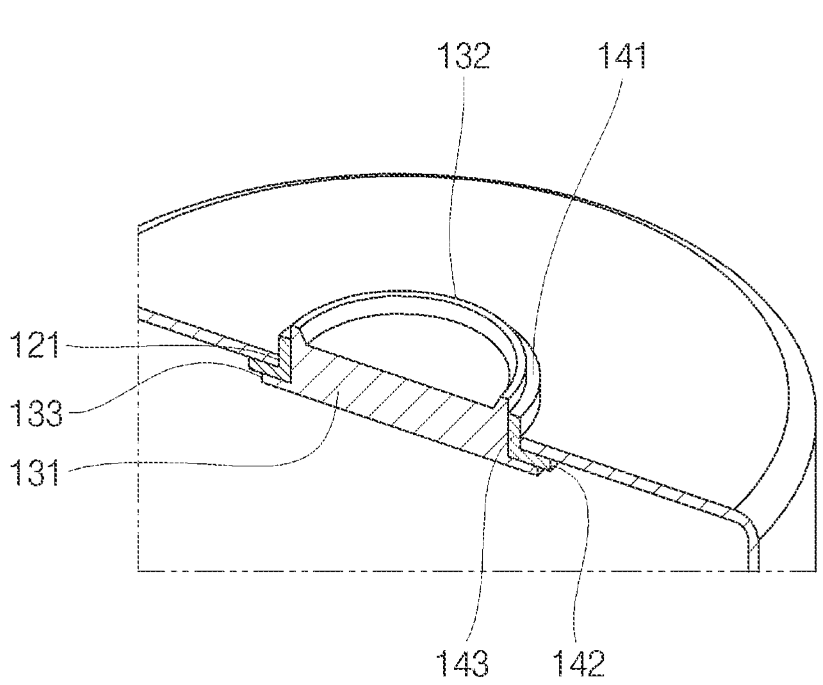
FIGS. 2 to 5 show a process of installing a rivet terminal in the secondary battery according to an embodiment of the present disclosure.
Figure 3:
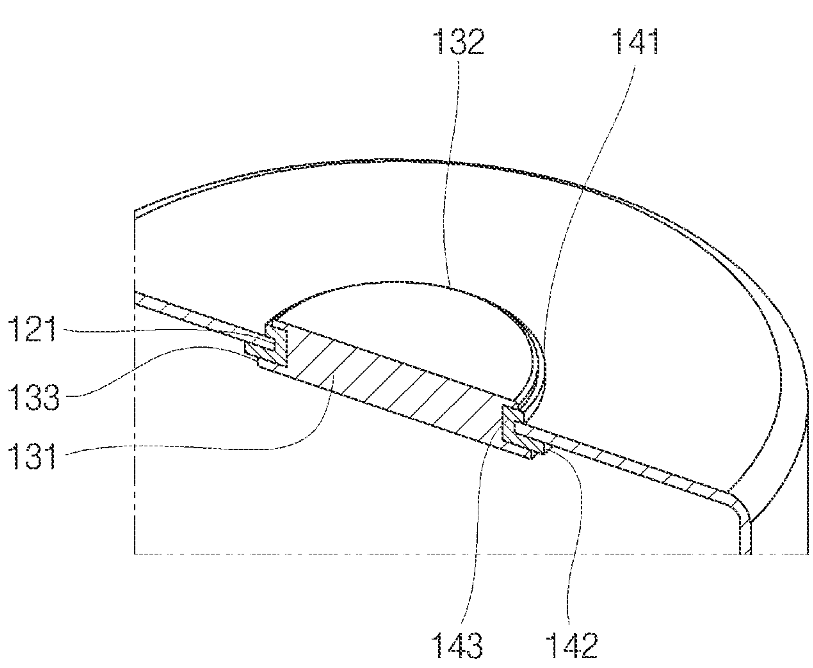

FIGS. 2 and 3 show a process for fixing the rivet terminal 130 from the outside of the can 120. Referring to FIG. 2, in the rivet terminal 130, the first flange 132 extends in parallel with the shaft 131, and the second flange 133 is pre-formed to extend at a right angle with respect to the shaft 131. In addition, in the gasket 140, like in the rivet terminal 130, the first member 141 also extends in parallel with the third member 143, and the second member 142 is pre-formed to extend at a right angle with respect to the third member 143. Accordingly, the rivet terminal 130 and the gasket 140 are inserted into the rivet hole 121 in the can 120 from the inside of the can 120 until the second member 142 of the gasket 140 comes into contact with the upper surface of the can 120 (see, e.g., FIG. 2). Next, the first flange 132 of the rivet terminal 130 and the first member 141 of the gasket 140 are deformed (riveted) together from the outside of the can 120 to be finished into a final rivet shape (see, e.g., FIG. 3).

Figure 4:
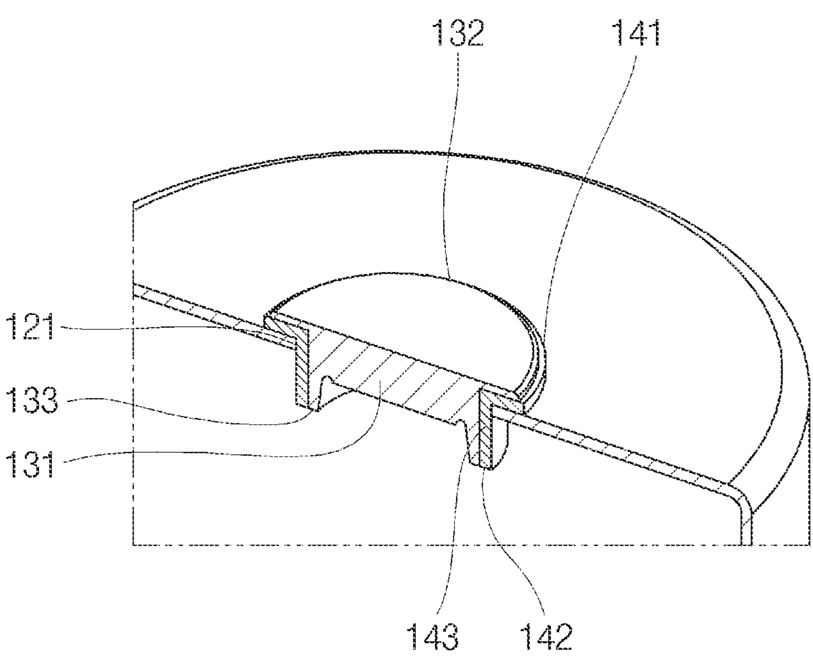
Figure 5:
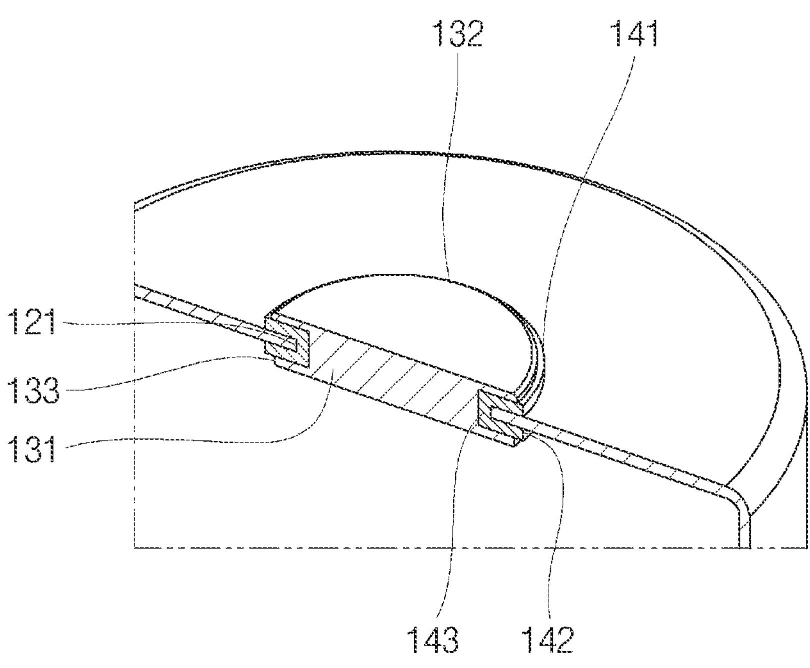

In another embodiment, the rivet terminal 130 may also be fixed from the inside of the can 120, which is shown in FIGS. 4 and 5. Referring to FIG. 4, the rivet terminal 130 has a first flange 132 that extends at a right angle with respect to the shaft 131, and a second flange 133 is pre-formed to extend in parallel with the shaft 131. In addition, in the gasket 140, like in the rivet terminal 130, the first member 141 extends at a right angle with respect to the third member 143, and the second member 142 is pre-formed in parallel with the third member 143. Accordingly, the rivet terminal 130 and the gasket 140 are inserted into the rivet hole 121 in the can 120 from the outside of the can 120 until the first member 141 of the gasket 140 comes into contact with the upper surface of the can 120 (see, e.g., FIG. 4). Next, the second flange 133 of the rivet terminal 130 and the second member 142 of the gasket 140 are deformed (riveted) together from the inside of the can 120 to be finished into a final rivet shape (see, e.g., FIG. 5).

The ratio (D1/D2) of the diameter D1 of the first flange 132 of the rivet terminal 130 to the diameter D2 of the upper surface of the can 120 may be in a range of about 10% to about 65%. Accordingly, sealing strength can be appropriately maintained while ensuring a sufficient space for welding busbars. The test results, shown in Table 1 below, show that when the can 120 withstands 25 kgf/cm$^2$ of internal pressure for 1 minute without leakage, it was determined as being "sealing strength: OK", otherwise "sealing strength: NG".

TABLE 1

| Test # | 1 | 2 | 3 | 4 | 5 | 6 | 7 |
|---|---|---|---|---|---|---|---|
| D1(mm) | 5 | 10 | 15 | 20 | 25 | 30 | 35 |
| D2(mm) | 46 | 46 | 46 | 46 | 46 | 46 | 46 |
| D1/D2(%) | About 10 | About 21 | About 32 | About 43 | About 54 | About 65 | About 76 |
| Result | Insufficient space for busbar welding | Sealing strength: OK | Sealing strength: OK | Sealing strength: OK | Sealing strength: OK | Sealing strength: OK | Sealing strength: NG |

Referring to FIG. 1, in the standard of a general cylindrical secondary battery 100, when the ratio (D1/D2) of the diameter (D1) of the first flange 132 of the rivet terminal 130 to the diameter (D2) of the upper surface of the can 120 is about 10% or more, the busbar welding space was determined to be sufficiently secured. In addition, when the ratio (D1/D2) of the diameter (D1) of the first flange 132 of the rivet terminal 130 to the diameter (D2) of the upper surface of the can 120 is about 65% or less, the sealing strength was determined to be appropriately adjusted.

The cap plate 150 seals the lower surface of the can 120. The cap plate 150 may include a safety vent 151 configured to release (e.g., vent) pressure by automatically breaking or tearing when excessive pressure is generated inside the can 120. In other embodiments, the cap plate 150 may include a degassing structure for removing gas when gas is generated when assembling the secondary battery 100. For example, the degassing structure itself may be substantially the same as degassing structures known in the art or could be easily derived therefrom by a person skilled in the art, and thus, a detailed description thereof will be omitted.

An additional gasket 160 is illustrated as being installed between the can 120 and the cap plate 150 to electrically insulate the same from each other. In this embodiment, the cap plate 150 will be electrically neutral. However, the cap plate 150 does not necessarily have to be electrically neutral, and in some embodiments, the cap plate 150 may contact the can 120 to have the same polarity as the can 120.

The secondary battery 100 has the rivet terminal 130 installed on one side of the can 120, not on the cap plate, so that the negative electrode and the positive electrode are both provided on one side of the can 120, while the safety vent 151 may be provided on the other side, that is, on (or in) the cap plate 150. Therefore, by connecting the bus bar on the one side, the safety vent 151 may be freely designed to release pressure smoothly from the opposite side thereof without interference from, in an assembly manner, the bus bar.

Figure 6:
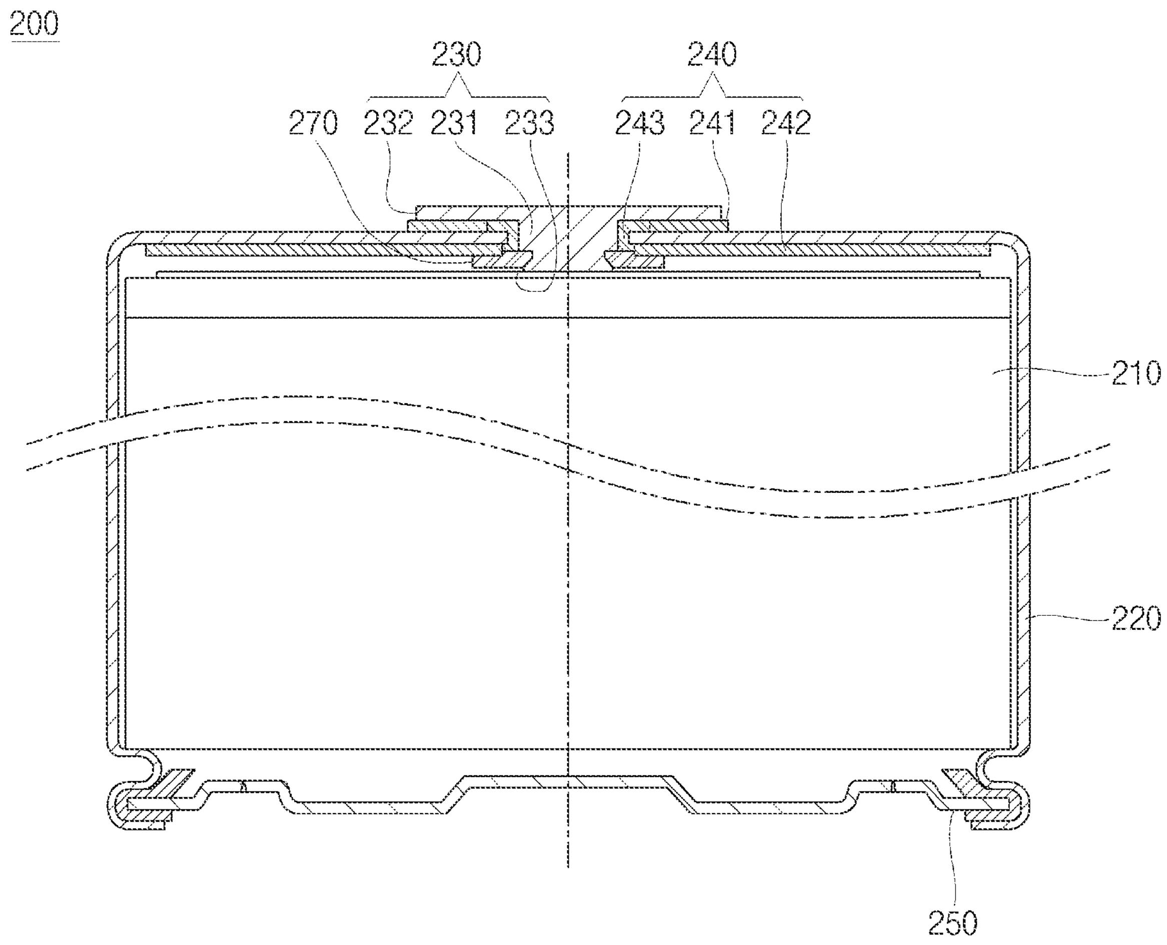
FIG. 6 is a schematic diagram of a secondary battery according to another embodiment of the present disclosure.

FIG. 6 is a schematic diagram of a secondary battery 200 according to another embodiment of the present disclosure.

When the secondary battery 200 is compared with the secondary battery 100, the secondary battery 200 further includes a reinforcement plate 270. The other parts are the same or are substantially the same as those of the secondary battery 100 described above, and thus, redundant descriptions thereof may be omitted.

Referring to FIG. 6, the secondary battery 200 includes an electrode assembly 210, a can 220, a rivet terminal 230, a gasket 240, a cap plate 250, and a reinforcement plate 270.

The reinforcement plate 270 is formed of a material having a higher rigidity than the rivet terminal 230 and is disposed between a second flange 233 of the rivet terminal 230 and a second member 242 of the gasket 240.

Figure 7:
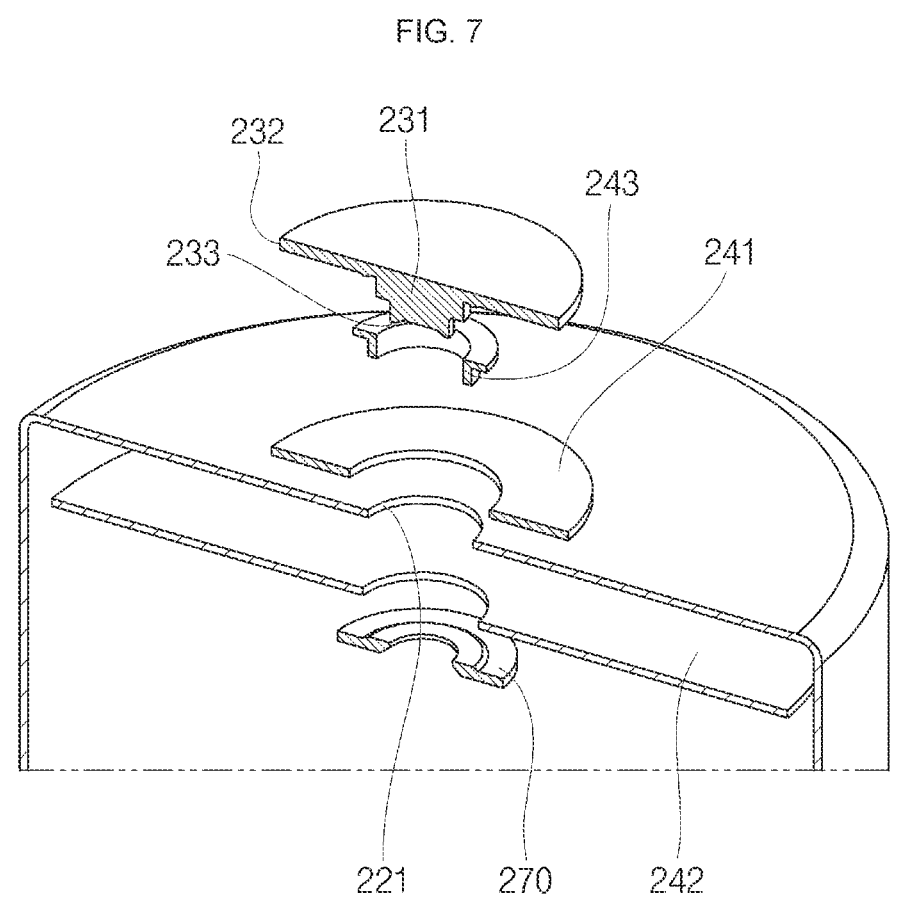
Figure 8:
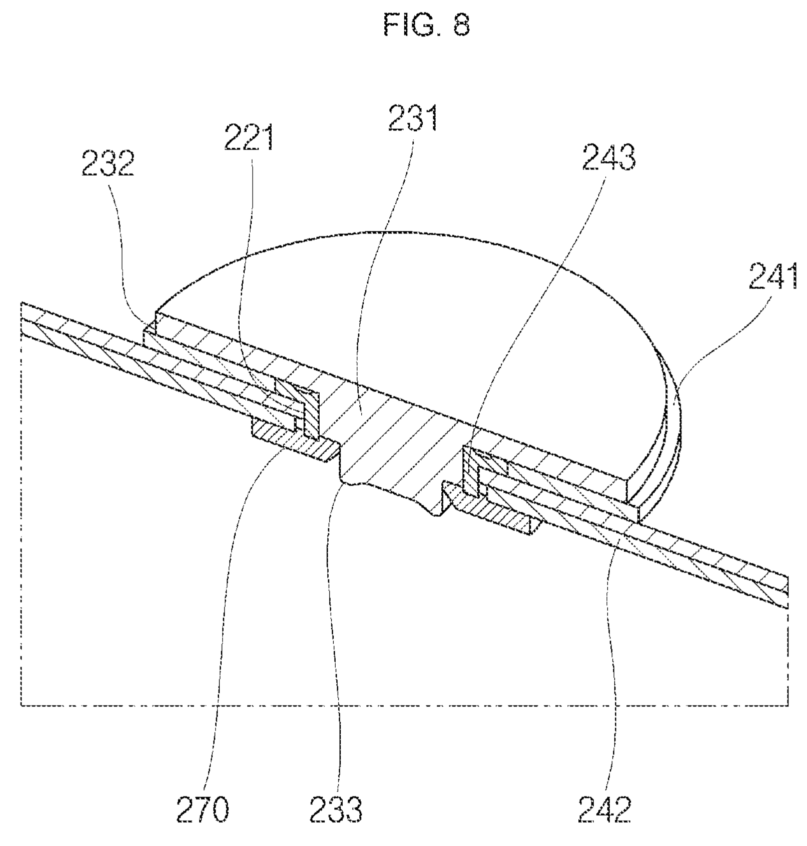
Figure 9:
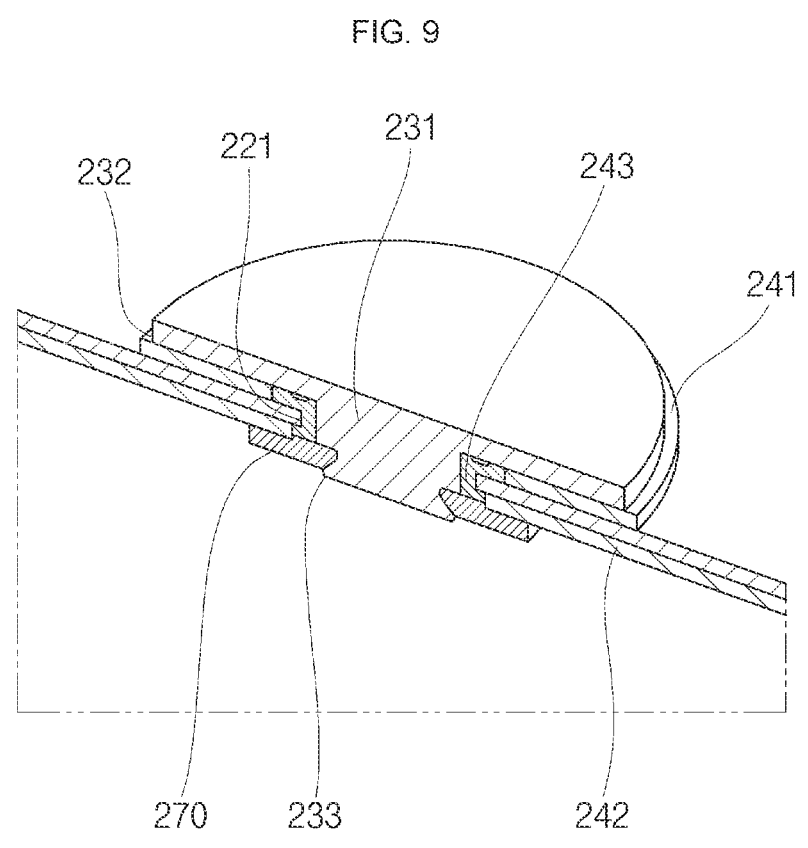

FIGS. 7 to 9 show a process of installing the rivet terminal 230 in the secondary battery 200. Referring to FIG. 7, a first flange 232 of the rivet terminal 230 extends at a right angle with respect to a shaft 231, and the second flange 233 is pre-formed to extend in parallel with the shaft 231. In addition, in relation to the gasket 240, the first member 241, the second member 242, and the third member 243 are separately formed. In another embodiment, however, the first member 241, the second member 242, and the third member 243 may be integrally formed. However, for ease of understanding, the following description will be made with respect to an embodiment in which the first member 241, the second member 242, and the third member 243 are separately formed. In this embodiment, the first member 241 and the second member 242 may have a ring shape. In addition, the upper end of the third member 243 may slightly protrude outwardly in the radial direction to be stably supported by a rivet hole (e.g., a rivet opening) 221. Accordingly, as shown in the drawing, the first member 241, the upper surface of the can 220, the second member 242, and the reinforcement plate 270 are sequentially positioned from above, and the rivet terminal 230 and the third member 243 are inserted together into the rivet hole 221 in the can 220 from the outside of the can 220 (see, e.g., FIGS. 7 and 8). Next, the second flange 233 of the rivet terminal 230 is deformed (riveted) from the inside of the can 220 to be finished into a final rivet shape (see, e.g., FIG. 9).

In the above-described process, the rivet terminal 230 is fixed from the inside of the can 220. The secondary battery 200 may also include a process for fixing the rivet terminal 230 from the outside of the can 220 as another embodiment thereof. In such an embodiment, the reinforcement plate 270 is disposed between the first flange 232 and the first member 241 of the rivet terminal 230. Such a feature could be easily implemented by a person skilled in the art with reference to the foregoing descriptions, and thus, a detailed description thereof may be omitted.

When the rivet terminal 230 is used as a positive (or negative) terminal, the rivet terminal 230 should be manufactured with a high-purity material to improve welding quality. However, a problem of reduced sealing strength due to relatively low rigidity may arise depending on material properties. By additionally installing the reinforcement plate 270 having a higher rigidity than the rivet terminal 230, the secondary battery 200 may have improved sealing strength.

As described above, according to embodiments of the present disclosure, the cylindrical can has one closed side and one open side to be electrically connected to the first electrode plate of the electrode assembly, and a rivet terminal is installed on one side (e.g., the closed side) of the can in a rivet manner to be electrically connected to the second electrode plate of the electrode assembly, thereby providing a negative electrode and a positive electrode on one surface of the can. The cap plate seals the other side (e.g., the open side) of the can and may include a safety vent. Therefore, when a bus bar is connected at the closed side, a safety vent may be freely designed to release pressure smoothly from the opposite open side thereof without interference from, in an assembly manner, the bus bar.

In addition, by adding a reinforcement plate having higher rigidity than the rivet terminal, when the rivet terminal is made of a high-purity material to improve welding quality, the sealing strength may be maintained.

The foregoing embodiments are examples for carrying out the secondary battery according to the present disclosure, and the present disclosure is not limited to the above-described embodiments. It will be understood by a person skilled in the art that various changes in form and details may be made therein without departing from the spirit and scope of the present disclosure as defined by the following claims and their equivalents.

What is claimed is:

1. A secondary battery comprising:

an electrode assembly comprising a first electrode plate, a second electrode plate, and a separator;

a can having a closed upper surface with a rivet opening therein and an open lower surface to accommodate the electrode assembly, the can being electrically connected to the first electrode plate;

a rivet terminal in the rivet opening and electrically connected to the second electrode plate;

a first gasket between the can and the rivet terminal;

a cap plate sealing the lower surface of the can; and a second gasket between the cap plate and the can to electrically insulate the cap plate and the can, wherein the cap plate has a protruding portion and a recessed portion around the protruding portion, and wherein the cap plate comprises a safety vent or a degassing structure in the recessed portion of the cap plate.

2. The secondary battery of claim 1, wherein the rivet terminal comprises:

a shaft extending through the rivet opening;

a first flange extending radially outwardly from an upper end of the shaft; and a second flange extending radially outwardly from a lower end of the shaft.

3. The secondary battery of claim 2, wherein the first gasket comprises:

a first member between the upper surface of the can and the first flange;

a second member between the upper surface of the can and the second flange; and a third member between the rivet opening and the shaft.

4. The secondary battery of claim 3, further comprising a reinforcement plate having higher rigidity than the rivet terminal and between the second flange and the second member.

5. The secondary battery of claim 2, wherein the ratio of a diameter of the first flange to a diameter of the upper surface of the can is in a range of 10% to 65%.

* * * * *